United States Patent Office 3,149,073
Patented Sept. 15, 1964

3,149,073
PREPARATION OF DISPERSIONS CONTAINING HYDROUS ALUMINUM OXIDE
Joseph John Nemes, Somerville, and Wendell Philip Munro, Martinsville, N.J., assignors to American Cyanamid Company, New York, N.Y., a corporation of Maine
No Drawing. Filed Feb. 14, 1962, Ser. No. 173,130
6 Claims. (Cl. 252—8.6)

This invention relates in general to an improvement in the preparation of compositions containing aluminum hydroxide and hydrous aluminum oxide, a composition comprising these materials which does not crystallize at temperatures above 40° F., a method of treating textiles with such a composition to improve their resistance to soiling, and the soil resistant materials which have been so treated.

In the textile field generally, and particularly in the rug industry, in recent years widespread use has been made of pastel colored rugs of synthetic texture which may or may not include blends of wool and, in almost all cases, evidence a tendency to soil more readily than all-wool rugs. An increased need for effective soil retardant compositions suitable for protecting this type of rug from soiling has become apparent.

There has been described in the prior art and specifically in copending application No. 57,373 of E. C. Yuille, filed September 21, 1960, now U.S. Patent No. 3,112,265, certain soil retardant compositions designed to function by filling in the imperfections and irregularities of the fiber surface making them relatively smooth. In this manner, the soil retardant material acts as a soil barrier. As an illustration of this, fibers in the pile portion of a pile fabric, such as a pile rug, are saturated with a soil retardant of the type described in the copending application so as to prevent impinging soil from adhering thereto. Once the treated fabric has been conditioned, dirt cannot become firmly attached and is only loosely held by the pile of the rug from which it falls to the bottom of the carpet, in which condition it is easily removed by a vacuum cleaner.

A desirable soil retardant composition to be commercially acceptable must not change the color of the rug when applied to the surface to be treated in effective amounts. Color change in the pile portion of rugs or carpets which have been treated with a soil retardant usually refers to a whitening of the fabric brought about by the fact that soil retardant materials of the inorganic type are normally white. This color change or whitening effect poses a substantial limitation on the use of a number of materials which otherwise would be acceptable soil retardants.

In addition to this property, a good soil retardant should not yellow upon drying or upon aging after application to the fabric. Moreover, it should not dust or be readily removed from the fibers to be treated therewith. Still further, a desirable soil retardant when employed in effective amounts should not substantially modify the hand of the finished material or give it a harsh or stiff surface.

Besides the above properties, certain other properties, as for example, the stability of formulations containing the soil retardant are very important to the practical application of a successful soil retardant composition. It has been found that in many instances a soil retardant material, while highly effective for retarding soil, avoiding discoloration and avoiding a stiff or rough hand, nevertheless cannot be effectively employed by textile finishers in that the composition in pad baths containing the same from which the composition is applied to the fabric become unstable with the result that an uneven distribution and application of the soil retardant composition occurs. From the standpoint of stability of dispersions of aluminum hydroxide prepared from aluminum sulfate and water-soluble alkalis employed as treating compositions, it has also been found that with solids concentrations effective for adequate fabric treatment upon storage at temperatures less than 70° F. for protracted periods of time, the compositions tend to form a mass of crystals therein which settle out upon storage. Thus when it is sought to employ the non-soiling composition, it is found to be necessary to reheat and rework the product in order to redissolve the crystals before the composition may be applied to the fabric. Needless to say, such treatment is time consuming and adds greatly to the cost of the finishing operation.

It is a primary object of the present invention, therefore, to disclose an improved composition for the prevention of soiling, which is stable under all storage conditions for an indefinite period of time.

It is a further object of the present invention to provide a process whereby a stable thixotropic aqueous dispersion of the soil retardant composition readily is prepared in a straightforward and direct manner.

It is a still further object of the present invention to provide a stable thixotropic aqueous dispersion of the soil retardant composition containing an aqueous colloidal dispersion of aluminum hydroxide, which is indefinitely stable, under conditions of storage involving temperatures above 40° F.

It is an additional object of the present invention to provide an improvement in a method for preparing a stable thixotropic aqueous dispersion of soil retardant material which when applied in effective amounts on suitable surfaces prone to soiling does not yellow on drying or aging, does not whiten or change the color of the surface applied thereto, nor modify or harshen the hand of such material when properly treated.

These and other objects and advantages of the present invention will become more apparent in the detailed description thereof set forth herein below.

In accord with the present invention, therefore, an improved process is provided for preparing a stable thixotropic aqueous dispersion containing a hydrated aluminum oxide prepared by adding aluminum sulfate to an alkaline solution until a pH between about 3 and 5 is obtained. The resulting dispersion is then adjusted to a pH of between 6 and 9 by addition of ammonium hydroxide or other like base. The aluminum hydroxide containing dispersion is treated with sufficient water-soluble calcium salt to precipitate about 50 to 100 percent of the sulphate ions as calcium sulfate. The order of addition of the ammonium hydroxide and the calcium salt may be reversed if desired. The aforesaid dispersion is then dispersed by means of a water-soluble phosphate dispersing agent and milled to provide a final product having a major portion of its particles of a 1.0 micron or less diameter. The improved product obtained is found to be indefinitely stable after prolonged storage at temperatures above 30° F. and found to evidence a high level of stability even at dilute concentrations.

By the term "a stable aqueous dispersion" as that term is employed herein is meant a dispersion which remains essentially homogenous for an indefinite period of time regardless of conditions of storage. It is characterized as being free from crystal formation and evidences excellent stability at all levels of concentration.

It is essential in the present process that the aluminum salt be added to the aqueous alkaline solution if a suitable product is to be obtained. It this regard, it has been our experience that the addition of an aqueous alkaline solution to an aqueous solution of an aluminum salt results in a product which is not stable in conventional application baths and which when settled is virtually impossible to readily redisperse. The addition of the water-soluble aluminum salt to the aqueous alkaline solution is preferably carried out with good agitation in order to achieve the best over-all results. The addition of the aluminum salt is carried out until a pH of between about 3 and 5 is obtained, it having been found that additions which carry the pH significantly below 3 do not improve the product and adversely affect its cost in that more materials and longer times are required for the process.

The adjusting of the dispersion resulting from the addition of the water-soluble aluminum salt to the aqueous alkaline solution to a value of between about 6 and 9 with ammonium hydroxide is a key element of the instant invention with regard to the thixotropic character of the final dispersion. Thus, it has been our experience that ammonium hydroxide is unique in its ability in the present process to confer thixotropy to the composition of this invention. In addition, the use of ammonia at this stage in the present process can be used to adjust the viscosity of the composition of this invention to a preferred range and further results in the production of a composition having what may be termed a mildly acidic or alkaline pH which is most desirable for such compositions where their end use is as soil retardant materials, since alkaline compositions tend to have little, if any, degradive effects upon fibrous materials.

The term "dispersing the precipitate by means of a water-soluble phosphate dispersing agent," as that term is employed in the present specification and claims, refers to the utilization of water-soluble phosphate dispersing agents at various steps or stages in the process of this invention. Thus, the suitable water-soluble phosphate dispersing agents may be present in the reaction medium at the time of the formation of the precipitate through the reaction of the aluminum salt and the alkaline material. Alternatively, the water-soluble phosphate dispersing agents may be employed and added to the composition after the formation of the insoluble precipitate. Preferably, these materials, i.e., the phosphate dispersing agents, are present in the initial solution and, in fact, are dissolved therein before the addition of alkali. This procedure is preferred in that after the addition of the aluminum salt and the formation of the precipitate it is somewhat more difficult to solubilize the normal or more common phosphate dispersing agents.

After the formation of the dispersion, the composition is homogenized or milled, as for example, by means of commercial homogenizers, such as a Manton-Gaulin homogenizer, at 3,000 pounds pressure or by means of a suitable Mikro pulverizer so as to break up aggregates of individual particles and to reduce coarse particles so that a final dispersion characterized by a major portion of the particles therein being of 1.0 micron and less in diameter. In the present specification the terms "milling" or "homogenizing" are employed interchangeably, and any procedure whereby an equivalent final product results other than by milling or homogenizing is contemplated.

The water-soluble aluminum salt of the instant invention is aluminum sulfate. This water-soluble aluminum salt may be employed singly or in combination with one or more of its hydrates or with other water-soluble aluminum salts wherein aluminum sulfate comprises more than about 50 percent.

The water-soluble calcium salts of the present invention, which when added prevent the formation of crystals, may be the calcium salts of certain inorganic and organic acids. Some examples of these salts would be calcium chloride, calcium nitrate, calcium formate, calcium acetate and the like. Of the calcium salts disclosed, those of inorganic acids, particularly calcium chloride are preferred because the sodium chloride formed has a solubility which does not vary appreciably with changes in temperature, although it is within the scope of the invention to include one or more of the aforesaid salts in combination with one another and with hydrates of these salts.

The water-soluble alkalis that may be employed in the present invention are the oxides, hydroxides, carbonates and bicarbonates of the alkali metals sodium, lithium and potassium. While it would be thought that ammonium hydroxide would be the equivalent of the alkali metal hydroxides contemplated, the use of ammonium hydroxide as the sole alkaline material results in a product which is unstable in an application bath. Additionally, the use of an alkali metal hydroxide to adjust the pH from between 3 and 5 to a mildly acidic or alkaline pH instead of ammonium hydroxide results in a product which is unstable and separates on standing forming an aqueous layer.

While the water-soluble aluminum salt may, in general, be added to the aqueous alkali solution until a pH of between about 3 and 5 is obtained, preferably this addition takes place until the pH of the solution is a value of between 3.5 and 4.5 inclusive, it having been found that the best over-all properties of the final dispersion, both with respect to its physical properties as well as its application properties, are achieved when the addition is carried out to this preferred pH range.

The addition of aqueous ammonium hydroxide to adjust the pH within the range of 6 to 9 is preferably carried out so that the pH is adjusted to a value of between 7.0–8.0. Final compositions characterized by a pH within this range also appear to be characterized by the best physical properties, i.e., stability and application properties, i.e., as soil retardant materials.

It is a distinct feature of the present invention that with the addition of a protective colloid to the prepared product prior to milling, the stability of dilute concentrations is greatly enhanced and little or no separation takes place in the application bath. Such well-known protective colloids as hydroxyethylcellulose, carboxymethylcellulose, hydroxymethylcellulose, hydroxypropylcellulose, and the like are representative of a few of the compounds which may be employed in the manner of the invention.

The dispersion of this invention contains water-soluble phosphate dispersing agents which, as noted above, may be added at virtually any step in the present process, though usually and preferably they are present in the composition before the final milling operation. Of the dispersing agents suggested to be employed in the process of this invention, only the phosphate dispersing agents, as for example, the metaphosphates, pyrophosphates, polyphosphates, and mixtures thereof have been employed with uniformly good success. Thus, for example, among the suitable soluble phosphate dispersing agents are tetrasodium pyrophosphate, sodium tripolyphosphate ($Na_5P_3O_{10}$), sodium metaphosphate, ammonium metaphosphate, sodium pyrophosphate, sodium polyphosphate ($Na_{12}P_{10}O_{31}$) and the like. The metaphosphates, as in the case of sodium metaphosphate, are preferably written as $(NaPO_3)_x$ and are intended to include the di, tri, tetra, penta, and hexa metaphosphates and the like. These compounds and mixtures thereof may be designated as condensed phosphates, which term includes both linear and cyclic metaphosphates. The phosphate salts of other metals such as potassium and the like may be employed where they function as dispersing agents and are water soluble.

The amount of water-soluble phosphate dispersing agent used must be sufficient to be effective as a dispersing agent, i.e., maintain a major portion of the precipitated particles in a dispersed state. A suitable quantity of phosphate dispersing agent is between 0.5 and 5.0 percent based on the final weight of the dispersion with between 1 and 2 percent inclusive being the preferred range.

As indicated above, best results are achieved when the aluminum salt is added slowly to the aqueous solution of the alkali with vigorous stirring of the reaction mixture. It is advantageous to circulate the reaction mixture by means of an external circulating pump and to add the solution of aluminum salt to the circulating charge at a point close to the pump inlet. Suitable agitation, however, may be accomplished by such conventional agitator devices as anchor stirrers, paddle stirrers and the like normally found in conventional plant equipment.

A finishing step of the process involves the milling of the dispersion so as to break up aggregates and reduce coarse particles so that the final product contains a major portion of particles of 1 micron and less. Milling may be carried out in any of a number of suitable milling and grinding devices. One that has been employed with particular benefit in the process of this invention is a Mikro pulverizer having screens with 0.0003 inch diameter holes, although other suitable devices may be employed.

In the preparation of the compositions of this invention, the water-soluble alkali material and the water-soluble aluminum salts are employed in amounts so as to prepare final compositions containing from between about 15 and 30 percent of the dispersed solids. In employing the alkali material, as for example, sodium hydroxide, and the water-soluble aluminum salt, as for example, commercial alum containing 18 moles of water of hydration and ammonium hydroxide, the total charge of alkaline material, i.e., the alkali metal oxide, carbonates etc. and ammonium on a molar basis with respect to the aluminum salt, will normally be from between 4.0 and 8.0 to 1. Expressed as equivalents, the total number of equivalents of alkaline material charged should be normally between 5 and 7 to 1 of the water-soluble aluminum salt.

The particle size of the compositions of this invention are such that a major portion of the working particles are less than 1 micron in size and that the ultimate particles of the composition are uniformly less than 1 micron in size. Particle sizes as reported herein are obtained by optical and electron microscopes and examinations of various factors after centrifuging to obtain the fractions.

The compositions of this invention will normally have a solids content of about 25 percent and a viscosity at 25° C. as measured in centipoises by the Brookfield viscosimeter of between 50 and 700, though preferably a viscosity of between 150 and 400 centipoises at 25° C. In those cases where the protective colloid has been added the range of viscosity will extend from about 5,000 to 8,000 centipoises. Additionally they are characterized by a specific gravity at 25° C. within the range of 1.1 and 1.3 and preferably within the range of 1.18 and 1.25.

Analysis of the products of this invention indicates that, exclusive of phosphate dispersing agents, they contain aluminum hydroxide, which term is intended to include hydrous aluminum oxide, i.e., aluminum oxide containing water of hydration or absorbed or adsorbed water and calcium sulfate. Additionally, the finished dispersions contain the alkali metal and ammonium salts of the anions of the aluminum salts employed and of the calcium salts, or these anions and cations are present in the final composition as their dissociated ions. Thus, compositions containing approximately 15 to 30 percent solids prepared in accordance with this invention may contain from between about 5 and 10 percent of aluminum hydroxide, the remainder of the solids comprise the alkali metal and ammonium salts and of the cations of the water-soluble aluminum salt and from 4 to 10 percent of the calcium salt of these cations depending on the amount of calcium chloride initially employed.

In a particular and preferred end use for the compositions of this invention, namely their use as soil retardants, dispersions of these materials may be applied to a suitable base normally subject to soiling by spraying followed by padding, furnishing rolls, immersion, exhaustion techniques, and the like. Preferably, the dispersion is applied by padding in accordance with procedures well known to those skilled in the textile finishing art.

By "surfaces subject to soiling" as that and similar expressions are employed herein, textile fabrics and in particular pile fabrics are contemplated. The principal examples of pile fabric and the area to which this aspect of the present invention is most closely related insofar as its application aspects are concerned is in carpeting and principally carpeting, which is classifiable as being of the pile type. The pile portion of such fabrics may be prepared from natural or synthetic fibers and thus may be composed of cotton, rayon, acetate, wool, the acrylic fibers, polyester fibers, nylon, and the like. Since carpeting made from cotton and rayon seems to have the greater tendency towards soiling, the instant invention is particularly applicable to base materials made of these fibers.

The composition of this invention is applied, as for example, to pile fabric and in particular the pile portion thereof so as to apply from between .25 to 5 percent based on the weight of the fabric or, in the case of pile fabric, on the weight of pile portion thereof. Preferably, amounts of from between about .5 and 3.0 percent solids based on the weight of the fabric has been found to be effective with a range of from between .75 and 1.5 percent solids being preferred for most purposes.

After application the fabric is normally dried, as for example, at temperatures up to 350° F. and more for periods of time sufficient to effect the drying of the material so finished.

In order that the present invention may be more fully understood, the following examples are given primarily by way of illustration. No details or enumerations contained therein should be construed as limiting of the present invention except insofar as they appear in the appended claims. All parts and percentages are by weight unless otherwise specifically designated.

EXAMPLE 1

Into a suitable vessel introduce 1,000 parts of water, 90 parts of sodium polyphosphate ("Sodaphos"), 1,860 parts of ice and 1,910 parts of 50 percent aqueous sodium hydroxide. To this solution add with good agitation, 5,700 parts of 54 percent aqueous aluminum sulfate [$Al_2(SO_4)_3 \cdot 18H_2O$] at the rate of 1,600 parts per hour. The reaction mixture has a pH of 3.8. Aqueous ammonium hydroxide (315 parts of 28 percent) is added slowly until the pH was 7.75. The resulting thixotropic dispersion is passed through a Mikro pulverizer using a screen with 0.003 inch diameter holes. The milled dispersion gives the following analytical data:

| | |
|---|---|
| Viscosity at 25° C. | 196 centipoises. |
| Specific gravity at 25° C. | 1.226. |
| Particle size | Major portion less than 1 micron. |
| Percent total solids [1] | 25.7. |

[1] Determined by drying a sample at 110° C. for 4 hours.

The total solids of the product of Example 1 have the following analysis:

| | Percent |
|---|---|
| $Na_2SO_4$ | 12.6 |
| $(NH_4)_2SO_4$ | 5.2 |
| $Al(OH)_3$ | 7.1 |
| Sodium polyphosphate | 0.7 |
| Total solids | 25.6 |

Into two separate batches of 500 parts each of the product produced below add slowly while stirring at high speed, either 60 parts of 200 parts of a 25 percent solution of calcium chloride. The thoroughly mixed products are then seeded with 1 or 2 crystals of sodium sulfate to hasten crystallization and stored at 12° C. Results in Table 1.

Table 1

| R-5173-154 | Parts by Weight | | |
|---|---|---|---|
| | 1 | 2 | 3 |
| Product of Example 1 | 500.0 | 500.0 | 500.0 |
| Calcium Chloride (25% Solution) | | 60.0 | 200.0 |
| Theoretical Amount Na₂SO₄ Converted to CaSO₄ (percent) | 0.0 | 30.0 | 100.0 |
| Crystals after storage at 12° C. for 6 months | Great many. | Many | None |

It is shown that a crystalline-free product can be produced when 100 percent of the sodium sulfate is converted to the calcium sulfate by the addition of calcium chloride.

EXAMPLE 2

In order to determine a concentration range of calcium chloride necessary to obtain a crystalline-free product of the aforementioned soil retardant, four separate preparations were made as follows:

Into each 1,000 parts of the product of Example 1 is slowly added (with high-speed stirring) 100, 200, 300 or 400 parts of a 25% solution of calcium chloride. The final products are seeded with 1 or 2 crystals of sodium sulfate and stored at 12° C. and observed after 15 days and also after 6 months. Results in Table II.

Table II

| | 1 | 2 | 3 | 4 | 5 |
|---|---|---|---|---|---|
| Product of Example 1 | 1000.0 | 1000.0 | 1000.0 | 1000.0 | 1000.0 |
| Calcium Chloride (25% soln.) | | 400.0 | 300.0 | 200.0 | 100.0 |
| Addition time (min.) | | 40 | 20 | 15 | 10 |
| Theoretical amount of NaSO₄ converted to CaSO₄, percent | | 100 | 75 | 50 | 25 |
| Physical Properties at 25° C.: | | | | | |
| pH | 7.05 | 6.95 | 7.0 | 7.03 | 7.0 |
| Calculated Total Solids (percent) | 25 | 25 | 25 | 25 | 25 |
| Crystals after 15 days' Storage at 12° C | Many | None | None | Few | Many |
| Crystals after 6 months' Storage at 12° C | Many | None | None | Few | Many |

Conversion of the sodium sulfate to calcium sulfate at between 50 percent and 100 percent produces a product which does not crystallize at 12° C. storage.

EXAMPLE 3

Into a suitable vessel is entered 4,320 parts of 20 percent sodium hydroxide solution and 80 parts of sodium polyphosphate. (Sodaphos.) This mixture is stirred and pump circulated for 15 minutes. To this is added 5,280 parts of aluminum sulfate [Al₂(SO₄)₃·18H₂O] at the rate of 1,300 parts/hour near the point of maximum agitation. Three thousand parts of a 25 percent solution of calcium chloride is added in the same manner. To the entire mixture is added slowly with stirring 223 parts of 28 percent ammonium hydroxide (NH₄OH) to a pH of 7.1.

PHYSICAL PROPERTIES AT 25° C.

pH—6.7
Spec. gravity, 1.2175
Particle size few 1–3, many 2–20 microns
Percent total solid 25.91.

The conversion of sodium sulfate to calcium sulfate in this product is theoretically 85%. The resultant product is stored for a period of 4 months at 12° C. without crystals appearing.

EXAMPLE 4

The products of Example 2 (parts 1–5) are applied from aqueous solutions at 1 percent solids (o.w.f.) on 5 x 5 inch white cotton and red wool and rayon pile rug by the conventional padding technique obtaining 100 percent wet pick-up. The treated rug samples are tumbled to allow fluffing of the pile and then dry at 225° F. for 40 minutes.

The soiling test is carried out by the procedure outlined in the American Dyestuff Reporter 45, 190 (1956) using a drum-type laboratory soiler and a synthetic soil. The "soiling index" is a measure of the amount of soiling the rug received in the soiling test and is defined in the following manner:

$$\text{Soiling index} = \frac{\text{Apparent soiling of treated carpet}}{\text{Apparent soiling of untreated carpet}}$$

and $$\text{Apparent soiling} = \frac{(1-R_s)^2}{2R_s} - \frac{(1-R_u)^2}{2R_u}$$

$R_s$ and $R_u$ are the fractions of light reflected from soiled and unsoiled rugs, respectively. Thus, a soiling index of less than 1.0 indicates that the treated rug was soiled less than the untreated rug, and a soiling index of more than 1.0 indicates that the treated carpet was soiled more than the untreated carpet.

Results in Table III show all applications to be approximately equal with no adverse effects due to the conversion of the sodium sulfate to the calcium sulfate in the soil retardant dispersions.

Table III

| Soil Retardant, Example 2 | Percent Conversion of Na₂SO₄ to CaSO₄ | Whitening on Red Rug | Dusting on White Rug | Discoloration on White Rug | | Soil Retardant Index | Hand (White Rug) |
|---|---|---|---|---|---|---|---|
| | | | | Initial | After Aging at 300° F. | | |
| Part 1 | | Standard | None | None | Slight | 0.53 | Standard. |
| Part 2 | 100 | Similar to standard. | Slight | do | do | 0.50 | Similar to standard. |
| Part 3 | 75 | do | do | do | do | 0.52 | Do. |
| Part 4 | 50 | do | do | do | do | 0.52 | Do. |
| Part 5 | 25 | do | do | do | do | 0.42 | Do. |

EXAMPLE 5

A

The product of Example 3, in which theoretically 75 percent of the sodium sulfate is converted into calcium sulfate, is applied at 1 percent solids (o.w.f.) from aqueous solutions to white cotton or red wool and rayon rug samples by the aforementioned method.

B

An application is also made using a similarly prepared product, but with no calcium chloride used.

After fluffing and drying as previously mentioned, the rug samples are tested for their soil retardancy. Results are shown in Table IV.

Table IV

| Soil Retardant | Whitening on Red Rug | Dusting on White Rug | Discoloration on White Rug | | Soiling Index | Initial Hand White Rug |
| --- | --- | --- | --- | --- | --- | --- |
| | | | Initial | After Aging at 300° F. | | |
| Used: | | | | | | |
| B | Slight | Standard | None | Slight | 0.518 | Standard. |
| A | do | Similar to standard. | do | do | 0.509 | Similar to standard. |

Results show essentially the same effects are obtained with both preparations of the soil retardant products.

EXAMPLE 6

ADDITION OF PROTECTIVE COLLOID TO SOIL RETARDANT

To 4,000 parts of the product of Example 3 (75% conversion of sodium sulfate to calcium sulfate) is added with slow stirring 0.4 part of diisobutylphenoxyethoxyethyl dimethyl benzyl ammonium chloride (Rhom and Haas—Hyamine[R]1622) as a mold inhibitor. With continued slow stirring, 20 parts of high viscosity hydroxyethyl cellulose (Natrosol 250) is added. The entire mixture is then stirred for 15–20 minutes and milled on a Mikro-pulverizer having screens with 0.003-inch diameter holes, although other suitable devices may be employed. This product is evaluated versus the product of Example 3 (no additives).

Application of 1 percent solids (o.w.f.) of aqueous solutions of each product are applied to white and red rug samples by padding. After fluffing and drying as previously described, the rug samples are evaluated for their soil retardancy properties. Results are shown in Table V.

Table V

| Soil Retardant Used | Whitening on Red Rug | Dusting on White Rug | Discoloration on White Rug | | Soil Retardant Index | Initial Hand White Rug |
| --- | --- | --- | --- | --- | --- | --- |
| | | | Initial | After Aging at 300° F. | | |
| Product Ex. 3 (no additive). | Slight | Standard | None | Slight | 0.35 | Standard. |
| Product Ex. 6 (with additive). | do | Similar to standard. | do | do | 0.37 | Similar to standard. |

The product of Example 6 containing the preservative and protective colloid is more stable than the product of Example 3 when diluted to 1 percent solids. Both products impart similar good soil retardant properties to the treated rug materials.

We claim:

1. In a process for preparing a thixotropic aqueous dispersion containing hydrous aluminum oxide which is stable and free of crystal formation after low temperature storage and which comprises adding a water-soluble aluminum salt to an aqueous solution of alkali metal base until a pH of between about 3 and 5 is obtained, adjusting the pH of the dispersion to between about 6 and 9 with ammonium hydroxide, dispersing the precipitate by means of a water-soluble phosphate dispersing agent, and milling the dispersion whereby a dispersion is provided having a major portion of particles which are 1.0 micron and less in diameter, the improvement which comprises adding a water soluble calcium salt selected from the group consisting of calcium chloride, calcium nitrate, calcium formate and calcium acetate to the milled dispersion.

2. A process according to claim 1 wherein the water soluble calcium salt is calcium chloride.

3. A process according to claim 1 wherein the water soluble aluminum salt is added to the aqueous solution of alkali metal base until a pH of 3.5–4.5 is achieved and the ammonium hydroxide is added until a pH of 7.0–8.0 is achieved.

4. In a process for preparing a thixotropic aqueous dispersion containing hydrous aluminum oxide which is stable at high dilution and free of crystal formation after low temperature storage and which comprises adding a water soluble aluminum salt to an aqueous solution of alkali metal base until a pH of between 3.0 and 5.0 is obtained, adjusting the pH of the dispersion to between about 6.0 and 9.0 with ammonium hydroxide, dispersing the precipitate formed by means of a water-soluble phosphate dispersing agent, and milling the dispersion to a particle size of 1.0 micron or less, the improvement which comprises the steps of adding a protective colloid selected from the group consisting of carboxymethyl cellulose, hydroxymethyl cellulose, hydroxyethyl cellulose and hydroxypropyl cellulose to the dispersion prior to milling and adding a water soluble calcium salt selected from the group consisting of calcium chloride, calcium nitrate, calcium formate and calcium acetate to the milled dispersion.

5. A process according to claim 4 wherein the water soluble aluminum salt is added to the aqueous solution of alkali metal base until a pH of 3.5–4.5 is achieved and the ammonium hydroxide is added until a pH of 7–8 is achieved.

6. A process according to claim 4 in which the water soluble calcium salt is calcium chloride.

References Cited in the file of this patent

UNITED STATES PATENTS

| | | |
| --- | --- | --- |
| 2,684,914 | Heiss | July 27, 1954 |
| 2,734,834 | Rainard et al. | Feb. 14, 1956 |
| 2,734,835 | Florio et al. | Feb. 14, 1956 |
| 2,909,451 | Lawler et al. | Oct. 20, 1959 |
| 2,987,474 | Wilson et al. | June 6, 1961 |